(12) United States Patent
Chang et al.

(10) Patent No.: US 8,341,336 B2
(45) Date of Patent: Dec. 25, 2012

(54) REGION-BASED MANAGEMENT METHOD OF NON-VOLATILE MEMORY

(75) Inventors: Yuan-Hao Chang, Taipei (TW); Tei-Wei Kuo, Taipei (TW)

(73) Assignee: National Taiwan University, Taipei (TW)

( * ) Notice: Subject to any disclaimer, the term of this patent is extended or adjusted under 35 U.S.C. 154(b) by 408 days.

(21) Appl. No.: 12/702,235

(22) Filed: Feb. 8, 2010

(65) Prior Publication Data
US 2011/0161562 A1 Jun. 30, 2011

(30) Foreign Application Priority Data
Dec. 24, 2009 (TW) .............................. 98144806 A

(51) Int. Cl.
*G06F 12/10* (2006.01)
(52) U.S. Cl. ............... 711/103; 711/E12.058; 714/6.13; 714/766; 714/773
(58) Field of Classification Search .................. None
See application file for complete search history.

(56) References Cited

U.S. PATENT DOCUMENTS

| | | | |
|---|---|---|---|
| 6,381,176 B1* | 4/2002 | Kim et al. ................. | 365/185.11 |
| 6,848,071 B2* | 1/2005 | Chaudhry et al. ............ | 714/763 |
| 7,278,068 B1* | 10/2007 | Crowder, Jr. .................. | 714/100 |
| 2001/0012222 A1* | 8/2001 | Terasaki ........................ | 365/200 |
| 2002/0108014 A1* | 8/2002 | Lasser ............................ | 711/103 |
| 2004/0083335 A1* | 4/2004 | Gonzalez et al. ............. | 711/103 |
| 2004/0111553 A1* | 6/2004 | Conley ........................... | 711/103 |
| 2004/0177216 A1* | 9/2004 | Asari et al. .................... | 711/103 |
| 2009/0271562 A1* | 10/2009 | Sinclair ......................... | 711/103 |

OTHER PUBLICATIONS

Tae-Sun Chung et al. "System Software for Flash Memory: A Survey." Oct. 2006. Springer Berlin. Lecture Notes in Computer Science. vol. 4096. pp. 394-404.*
Jeong-Uk Kang et al. "A Superblock-based Flash Translation Layer for NAND Flash Memory." Oct. 2006. ACM. EMSOFT'06.*
Wu et al., "An Efficient B-Tree Layer Implementation for Flash-Memory Storage Systems," ACM Transactions on Embedded Computing Systems, vol. 6, No. 3, Article 19, Jul. 2007, pp. 1-23.
Wu et al. "An Adaptive Two-Level Management for the Flash Translation Layer in Embedded Systems," ICCAD '06, Nov. 5-9, 2006, pp. 601-606.
Park et al., "CFLRU: A Replacement Algorithm for Flash Memory," CASES'06, Oct. 23-25, 2006, Seoul, Korea, pp. 234-241.
Chang et al., "A Commitment-based Management Strategy for the Performance and Reliability Enhancement of Flash-memory Storage Systems," DAC'09, Jul. 26-31, 2009, San Francisco, CA, USA, pp. 858-863.
Birrell et al., "A Design for High-Performance Flash Disks," Microsoft Research Silicon Valley, Apr. 2007, pp. 88-93.

(Continued)

*Primary Examiner* — Nathan Sadler
(74) *Attorney, Agent, or Firm* — Jianq Chyun IP Office

(57) ABSTRACT

A region-based management method of a non-volatile memory is provided. In the region-based management method, the storage space of all chips in the non-volatile memory is divided into physical regions, physical block sets, and physical page sets, and a logical space is divided into virtual regions, virtual blocks, and virtual pages. In the non-volatile memory, each physical block set is the smallest unit of space allocation and garbage collection, and each physical page set is the smallest unit of data access. The region-based management method includes a three-level address translation architecture for converting logical block addresses into physical block addresses.

14 Claims, 5 Drawing Sheets

OTHER PUBLICATIONS

Kgil et al., "FlashCache: A NAND Flash Memory File Cache for Low Power Web Servers," Proceedings of the 2006 International Conference on Compilers, Architecture, and Synthesis for Embedded Systems, Oct. 23-25, 2006, pp. 103-112.

Kim et al., "LGeDBMS: a Small DBMS for Embedded System with Flash Memory," Proceedings of the 32nd International Conference on Very Large Databases, Sep. 12-15, 2006, pp. 1255-1258.

Chang et al., "An Efficient Management Scheme for Large-Scale Flash-Memory Storage Systems," 2004 ACM Symposium on Applied Computing, Mar. 14-17, 2004, pp. 862-868.

Jo et al., "FAB: Flash-Aware Buffer Management Policy for Portable Media Players," IEEE Transactions on Consumer Electronics 52 (2), May 2006, pp. 485-493.

Kim et al., "BPLRU: A Buffer Management Scheme for Improving Random Writes in Flash Storage," FAST '08: 6th USENIX Conference on File and Storage Technologies, 2008, pp. 239-252.

* cited by examiner

REGION-BASED MANAGEMENT METHOD OF NON-VOLATILE MEMORY

CROSS-REFERENCE TO RELATED APPLICATION

This application claims the priority benefit of Taiwan application serial no. 98144806, filed on Dec. 24, 2009. The entirety of the above-mentioned patent application is hereby incorporated by reference herein and made a part of specification.

BACKGROUND OF THE INVENTION

1. Field of the Invention

The present invention generally relates to the management of a storage space of a non-volatile memory, and more particularly, to a region-based management method that divides the storage space into three levels.

2. Description of Related Art

The low fabrication cost of flash memory has been a major motivation in the development of flash memory. A flash memory chip is composed of blocks, and each of the blocks is further composed of pages. Each block is the basic data erasing unit, while each page is the basic data accessing unit. Once data is written into a page, no other data can be written into the same page until the block corresponding to the page is entirely erased. Thus, data is usually written into free pages instead of the original pages in consideration of the performance. Accordingly, a logical block address (LBA) and physical address translation mechanism or information is required to locate data corresponding to each LBA.

Flash memories can be categorized into low-cost multi-level cell (MLC) flash memories and conventional single-level cell (SLC) flash memories with higher cost. Different mechanisms for managing the data storage space of flash memory have been provided. However, the performance of flash memory decreases along with the fabrication cost thereof. Additionally, two restrictions on writing data into MLC flash memory have been newly established. One restriction is that each page can only be written once, and the other restriction is that the pages in each block have to be written in sequence. Thereby, the conventional management mechanisms are either incapable of managing low-cost MLC flash memory or very inefficient in doing so.

In order to improve the access efficiency of the entire system, some special methods for managing data to be written in small quantities have been provided. In addition, some adaptable address translation mechanisms for managing flash memory storage systems with large capacities have been further provided in order to improve the expansibility of the management mechanisms. In some other mechanisms, a write buffer is adopted in order to improve the efficiency of writing data into a flash memory. However, in a storage system adopting such a mechanism, data may be lost when the system fails or the power supply is cut off. As a result, the storage system lacks data consistency.

However, none of aforementioned techniques takes the scalability of the management method into consideration, and this feature is very important to flash memory storage devices with increasing capacity. Besides, MLC flash memories usually have more damaged blocks. New damaged blocks have a higher tendency to appear when MLC flash memories are used. Moreover, the pages of MLC flash memories have a higher data error rate. However, none of the existing techniques restores data of error pages in damaged blocks while managing damaged blocks.

SUMMARY OF THE INVENTION

Accordingly, the present invention is directed to a region-based management method applicable to a non-volatile memory, wherein the data access efficiency of the non-volatile memory is increased and the management of damaged blocks is improved.

The aforementioned non-volatile memory includes one or more chips. Each of the chips includes a plurality of physical blocks. Each of the physical blocks includes a plurality of physical pages. The region-based management method includes following steps. The physical blocks of the chips are grouped into a plurality of physical regions and a spare region. Each of the physical regions and the spare region includes a plurality of physical blocks. Each of the physical regions is divided into a plurality of physical block sets, wherein each of the physical block sets is composed of the physical blocks that belong to different chips and have the same number. Each of the physical block sets is divided into a plurality of physical page sets, wherein each of the physical page sets is composed of the physical pages having the same offset in the physical blocks of the physical block set containing the particular physical page set. In the region-based management method, each of the physical block sets is the smallest unit of space allocation and garbage collection, while each of the physical page sets is the smallest unit of data access.

According to an embodiment of the present invention, the non-volatile memory is a multi-level cell (MLC) flash memory.

According to an embodiment of the present invention, the region-based management method further includes following steps. A logical space is defined, wherein the logical space includes a plurality of virtual regions, each of the virtual regions includes a plurality of virtual blocks, and each of the virtual blocks includes a plurality of virtual pages. Each of the virtual regions is sequentially mapped to one of the physical regions. Each of the virtual blocks is mapped to one of the physical block sets in the physical region mapped to the virtual region containing the particular virtual block. Each of the virtual pages is mapped to one of the physical page sets in the physical block set mapped to the virtual block containing the particular virtual page.

According to an embodiment of the present invention, each of the virtual regions corresponds to a virtual block table. Each of the virtual blocks corresponds to a virtual page table. A virtual region table records the addresses of the virtual block tables in a random access memory (RAM). The region-based management method further includes following steps. A logical block address (LBA) is received. The virtual region table, one of the virtual block tables, and one of the virtual page tables are looked up by using the LBA, so as to obtain the physical block address (PBA) of the data corresponding to the LBA in the non-volatile memory.

According to an embodiment of the present invention, the region-based management method further includes following steps. When one of the physical blocks is damaged, a spare block is selected among the physical blocks in the spare region that belongs to the same chip as the damaged block does for replacing the damaged block. The number of the chip containing to the damaged block and the spare block are recorded in a block replacement table. The numbers of the damaged block and the spare block in the chip are also recorded in the block replacement table.

According to an embodiment of the present invention, one of the physical page sets of each of the physical block sets is assigned as a summary page set, and the region-based management method further includes following steps. Every time when a physical page set is filled up with data, an operation is performed on data in the physical page set and a checksum of the physical block set containing the physical page set to generate a new checksum covering all the data in the physical block set. When the system containing the non-volatile memory is shut down or when the physical block set excluding the summary page set is filled up with data, the checksum is written into the summary page set.

According to an embodiment of the present invention, the summary page set is composed of the last physical page in each of the physical blocks of the physical block set. The operation performed on the data and the checksum is an exclusive-or operation. The checksum is used for restoring data in a damaged block.

The present invention provides a three-level address translation architecture between LBAs and PBAs and a damaged block management method that are highly scalable and can improve the access efficiency and reliability of a non-volatile memory.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
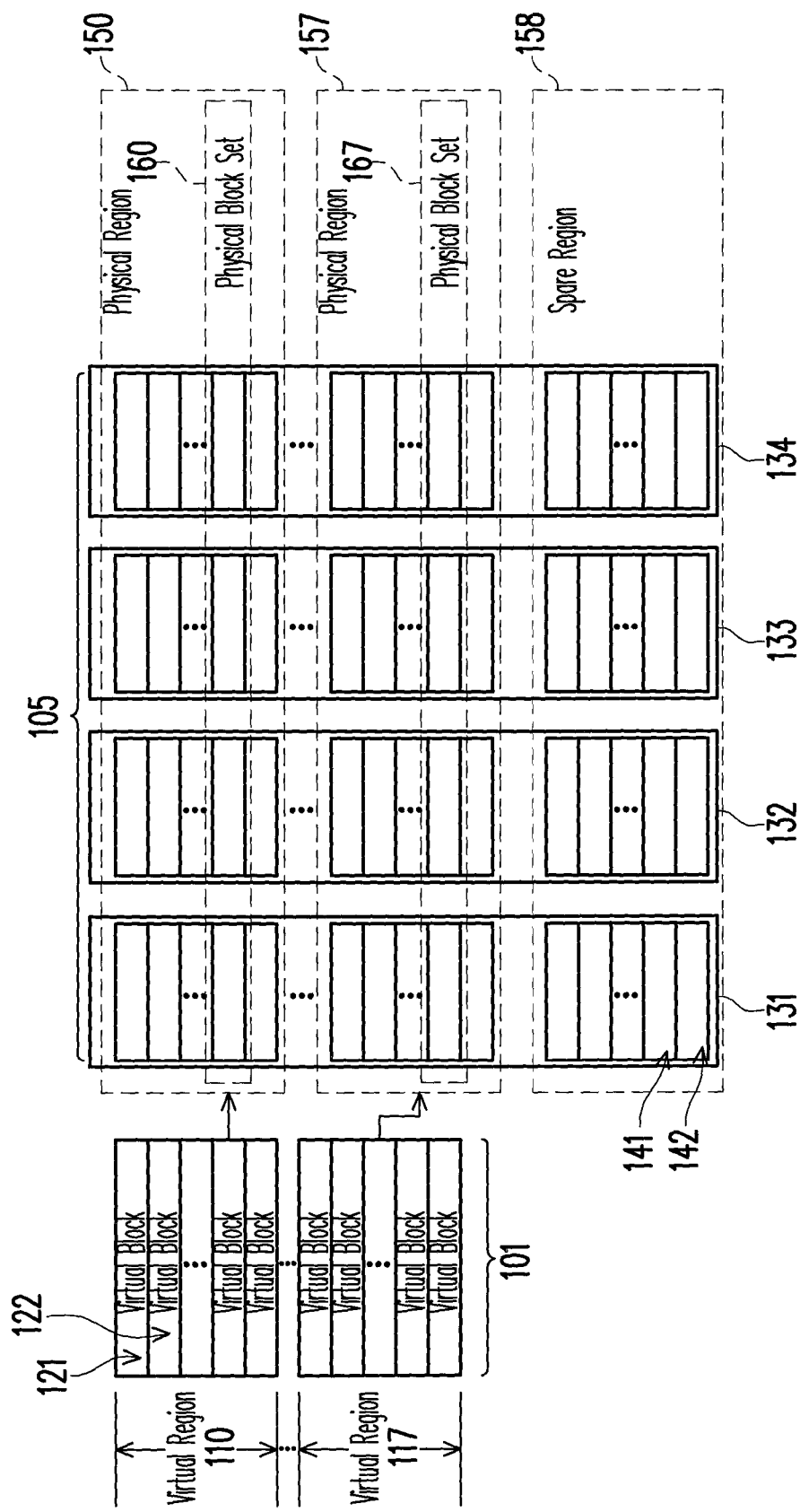
FIG. 1 is a schematic diagram of a non-volatile memory and a logical space according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
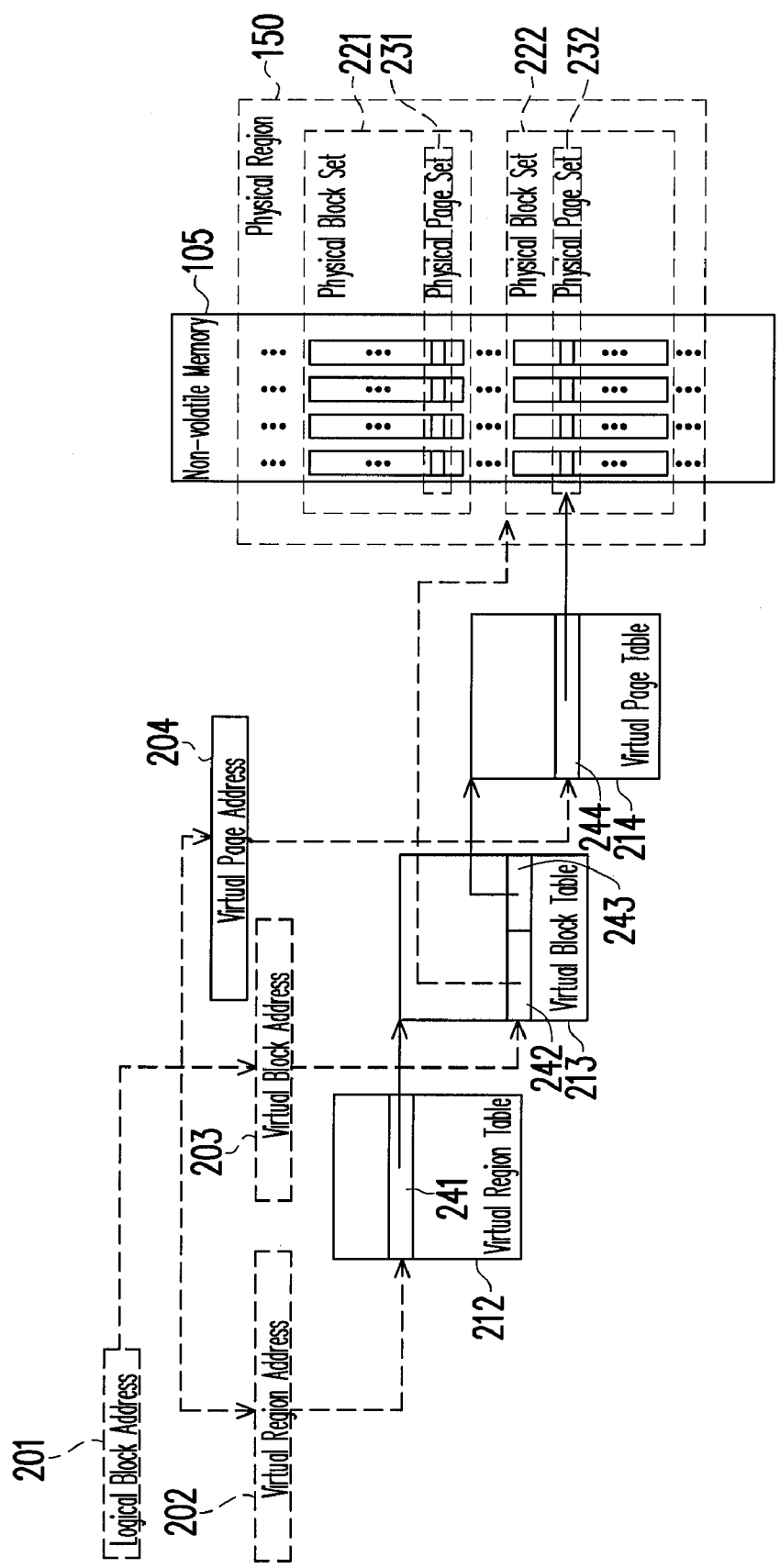
FIG. 2 is a schematic diagram of the non-volatile memory in FIG. 1 and a three-level address translation architecture thereof.

FIG. 1 is a diagram of a non-volatile memory 105 and a logical space 101 according to an embodiment of the present invention. FIG. 2 is a diagram of the non-volatile memory 105 and a three-level address translation architecture thereof. The non-volatile memory 105 is a part of a non-volatile memory storage system. In the present embodiment, the non-volatile memory 105 is a multi-level cell (MLC) flash memory. However, the present invention is not limited thereto, and in other embodiments of the present invention, the non-volatile memory 105 may also be other types of non-volatile memory. The non-volatile memory 105 includes four chips 131-134. Each of the chips 131-134, includes a plurality of physical blocks. For example, the chip 131 includes physical blocks 141 and 142. Each of the physical blocks includes a plurality of physical pages (not shown). However, the present invention is not limited thereto, and in other embodiments of the present invention, the non-volatile memory may include only one chip or include more chips.

Figure 3:
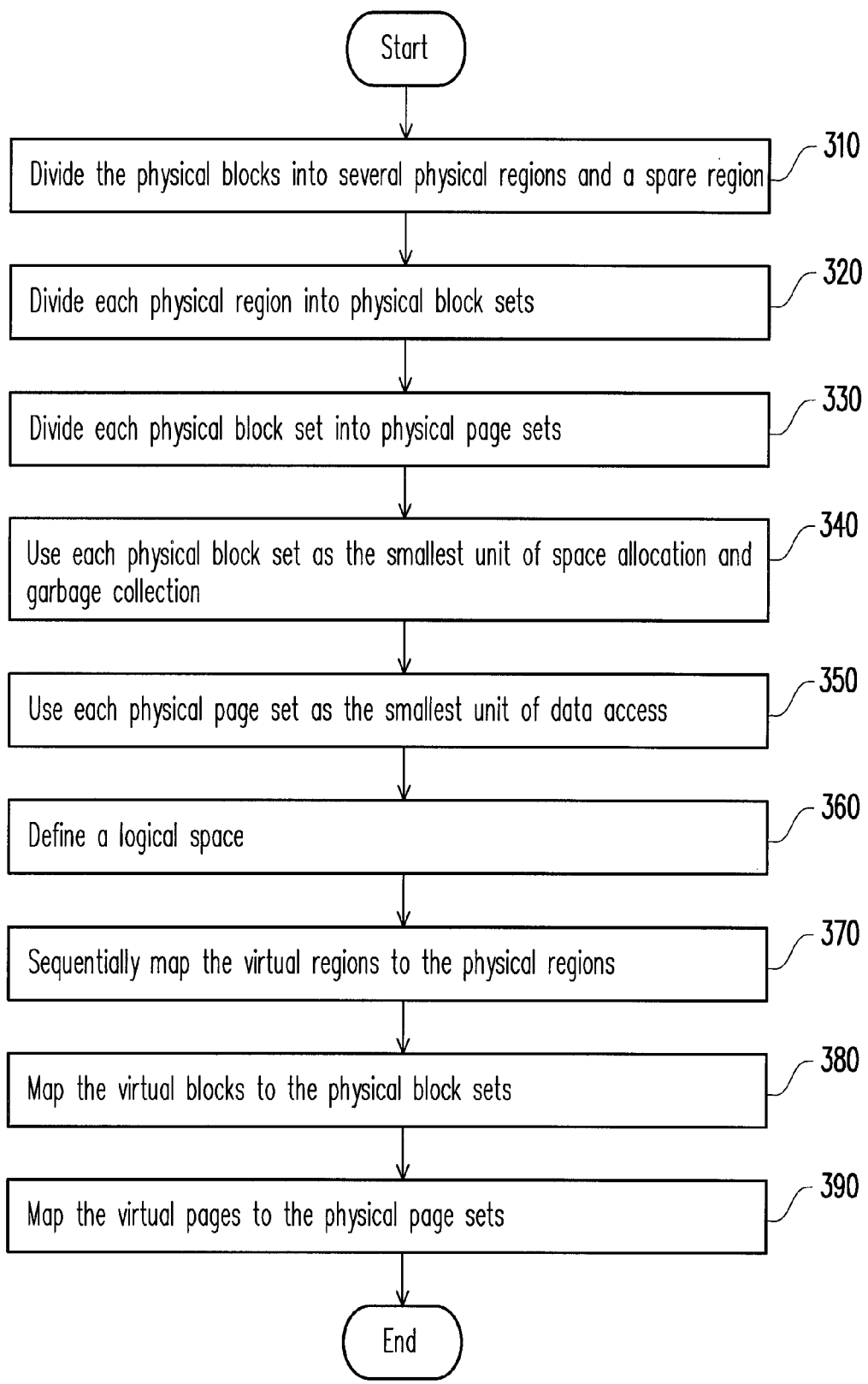
FIG. 3, FIG. 4, and FIG. 5 are flowcharts of a region-based management method applicable to the non-volatile memory in FIG. 1.

FIG. 3 is a flowchart of a region-based management method applicable to the non-volatile memory 105 according to the present embodiment. Below, steps in the region-based management method will be described in detail.

First, the physical blocks in the chips 131-134 are grouped into physical regions 150-157 and a spare region 158. Each of the physical regions 150-157 and the spare region 158 includes a plurality of physical blocks (step 310). Each physical region is divided into a plurality of physical block sets, wherein each of the physical block sets is composed of physical blocks that are in different chips and have the same number (step 320). For example, the physical region 150 includes a physical block set 160, the physical region 157 includes a physical block set 167, and the physical region 150 in FIG. 2 further includes physical block sets 221 and 222. Next, each physical block sets is divided into a plurality of physical page sets. Each physical page set is composed of physical pages having the same offset in the physical blocks of the physical block set containing the aforementioned physical page set (step 330). For example, as shown in FIG. 2, the physical block set 221 includes a physical page set 231, and the physical block set 222 includes a physical page set 232. In the region-based management method provided by the present embodiment, each physical block set is the smallest unit of space allocation and garbage collection (step 340), and each physical page set is the smallest unit of data access (step 350). To satisfy the writing restrictions of MLC flash memory, data is sequentially written into a physical block set starting from the first physical page set.

In the region-based management method provided by the present embodiment, a mapping relationship is established between the logical space 101 and the non-volatile memory 105. First, the logical space 101 is defined (step 360), wherein the logical space 101 includes virtual regions 110-117, and each of the virtual regions includes a plurality of virtual blocks. For example, the virtual region 110 includes virtual blocks 121 and 122. Each of the virtual blocks includes a plurality of virtual pages (not shown). In the region-based management method provided by the present embodiment, each of the virtual regions 110-117 is sequentially mapped to one of the physical regions 150-157 (step 370). Each of the virtual blocks is mapped to one of the physical block sets in the physical region mapped to the virtual region containing the particular virtual block (step 380). Each of the virtual pages is mapped to one of the physical page sets of the physical block set mapped to the virtual block containing the particular virtual page (step 390).

In the storage system of the present embodiment, a virtual region table is maintained. A virtual block table is maintained corresponding to each virtual region. Moreover, a virtual page table is maintained corresponding to each virtual block. The storage system in the present embodiment has a random access memory (RAM, not shown) for storing data required by the storage system for executing the region-based management method in the present embodiment. The virtual region table records the addresses of the virtual block tables in the RAM. Each virtual block table records the address translation information of the virtual blocks in the corresponding virtual region and the physical block sets corresponding to the virtual blocks. Besides, each virtual block table also records the addresses of the virtual page tables corresponding to each virtual block in the corresponding virtual region in the RAM. Each virtual page table records the address translation information of the virtual pages in the corresponding virtual block and the physical page sets corresponding to the virtual pages.

Figure 4:
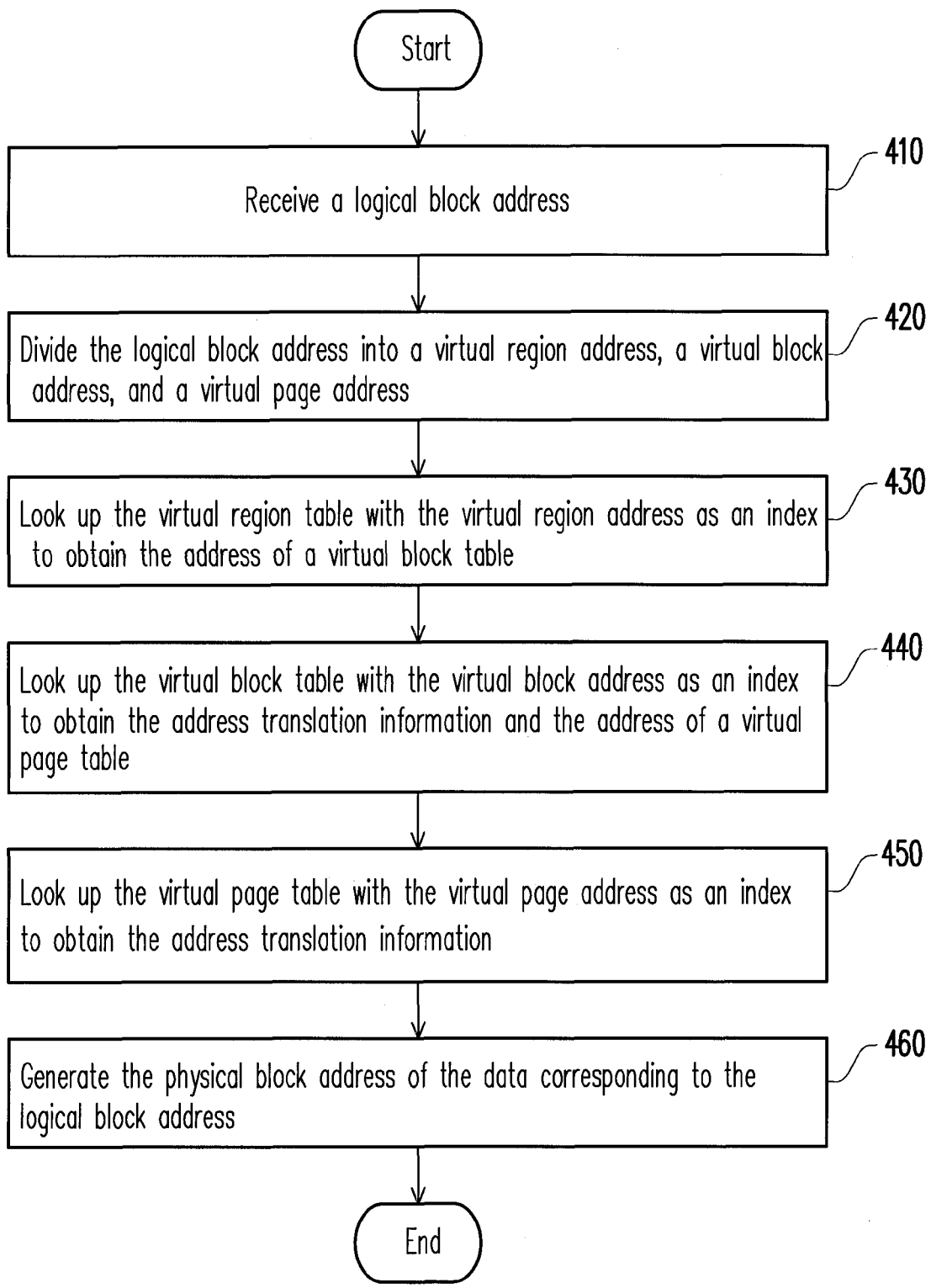

FIG. 4 is another flowchart of the region-based management method in the present invention, and this flow is applicable to the three-level address translation architecture in the present embodiment. Below, the flow in FIG. 4 will be described with reference to FIG. 2.

Firstly, a logical block address (LBA) 201 input into the storage system is received (step 410). Next, the LBA 201 is divided into a virtual region address 202, a virtual block address 203 and a virtual page address 204 (step 420).

Because the virtual regions 110-117 are sequentially mapped to the physical regions 150-157, the address of the corresponding physical region can be easily obtained according to the virtual region address 202. Next, a virtual region table 212 is looked up with the virtual region address 202 as an index to obtain the address 241 of the virtual block table 213 corresponding to the virtual region corresponding to the virtual region address 202 in the RAM (step 430). After that, the virtual block table 213 is looked up with the virtual block address 203 as an index to obtain the address translation information 242 of the virtual block corresponding to the virtual block address 203 and the address 243 of the virtual page table 214 corresponding to the virtual block in the RAM (step 440). The address translation information 242 may be the offset of the physical block set 222 mapped to the virtual block corresponding to the virtual block address 203 in the physical region 150, which is used for locating the physical block set 222 in the physical region 150.

Next, the virtual page table 214 is looked up with the virtual page address 204 as an index to obtain the address translation information 244 of the virtual page corresponding to the virtual page address 204 (step 450). The address translation information 244 may be the offset of the physical page set 232 mapped to the virtual page corresponding to the virtual page address 204 in the physical block set 222, and which is used for locating the physical page set 232 in the physical block set 222. Next, the physical block address (PBA) of the data corresponding to the LBA 201 in the non-volatile memory 105 is generated according to the virtual region address 202, the address translation information 242, and the address translation information 244 (step 460).

Every time when a virtual region or a virtual block is accessed and no corresponding virtual block table or virtual page table is found in the RAM of the storage system, the corresponding virtual block table or virtual page table is read from a predetermined place of the non-volatile memory 105 and then stored into the RAM. In addition, the corresponding virtual block table or virtual page table may also be directly established in the RAM by scanning the non-volatile memory 105.

If the corresponding virtual block table or virtual page table is read from the predetermined place of the non-volatile memory 105, all the virtual block tables may be stored in the spare region 158. When a virtual region is accessed, the corresponding virtual block table is read from the spare region 158 and stored into the RAM. When the storage system is shut down and the virtual block table is updated since the last reading from the spare region 158, the virtual block table is written back into the spare region 158.

As to the virtual page table, one of the physical page set in each physical block set is assigned as a summary page set, and the virtual page table is stored in the summary page set. In the present embodiment, in order to satisfy the sequential writing restriction of MLC flash memory, the summary page set is composed of the last physical page in each physical block of the physical block set. In other embodiments of the present invention, another physical page set may be assigned as the summary page set if another type of non-volatile memory is adopted. When a virtual block is accessed, the virtual page table corresponding to the virtual block is read from the summary page set of the physical block set mapped to the virtual block and stored into the RAM. When the storage system is shut down and the virtual page table has been updated since the last reading from the summary page set, the virtual page table is written back into the corresponding summary page set.

If the corresponding virtual block table or virtual page table is directly established in the RAM by scanning the non-volatile memory 105, when a virtual region is accessed, the LBA stored in the spare area of any physical page (for example, the first physical page) in each physical block set of the physical region mapped to the virtual region is read. Accordingly, the mapping relationship between the virtual blocks and the physical block sets can be obtained according to the LBA and the virtual block table corresponding to the virtual region can be established. The virtual block table can be quickly established because only the spare area of one of the pages in each physical block set is read.

The virtual page table can be established through the same method. When a virtual block is accessed, the LBA stored in the spare area of any physical page of each physical page set in the physical block set mapped to the virtual block is read. Accordingly, the mapping relationship between the physical page sets and the virtual pages can be obtained according to the LBA, and the virtual page table corresponding to the virtual block can be established. Because the spare area is read regarding each physical page set and there are many physical page sets, it takes a long time to establish the virtual page table through the method described above. Thus, the virtual page table is usually stored in the summary page set and directly read after the storage system is booted up. The virtual page table is established through the scanning technique only when the system fails and accordingly the virtual page table stored in the summary page set is inconsistent with the actual data or when the summary page set is damaged.

The virtual region table is not stored in the non-volatile memory 105. Instead, it is gradually established in the RAM after the storage system is boot up. As long as a new virtual block table appears in the RAM, the address of the virtual block table is inserted into the virtual region table regardless of whether the virtual block table is read or established.

Figure 5:
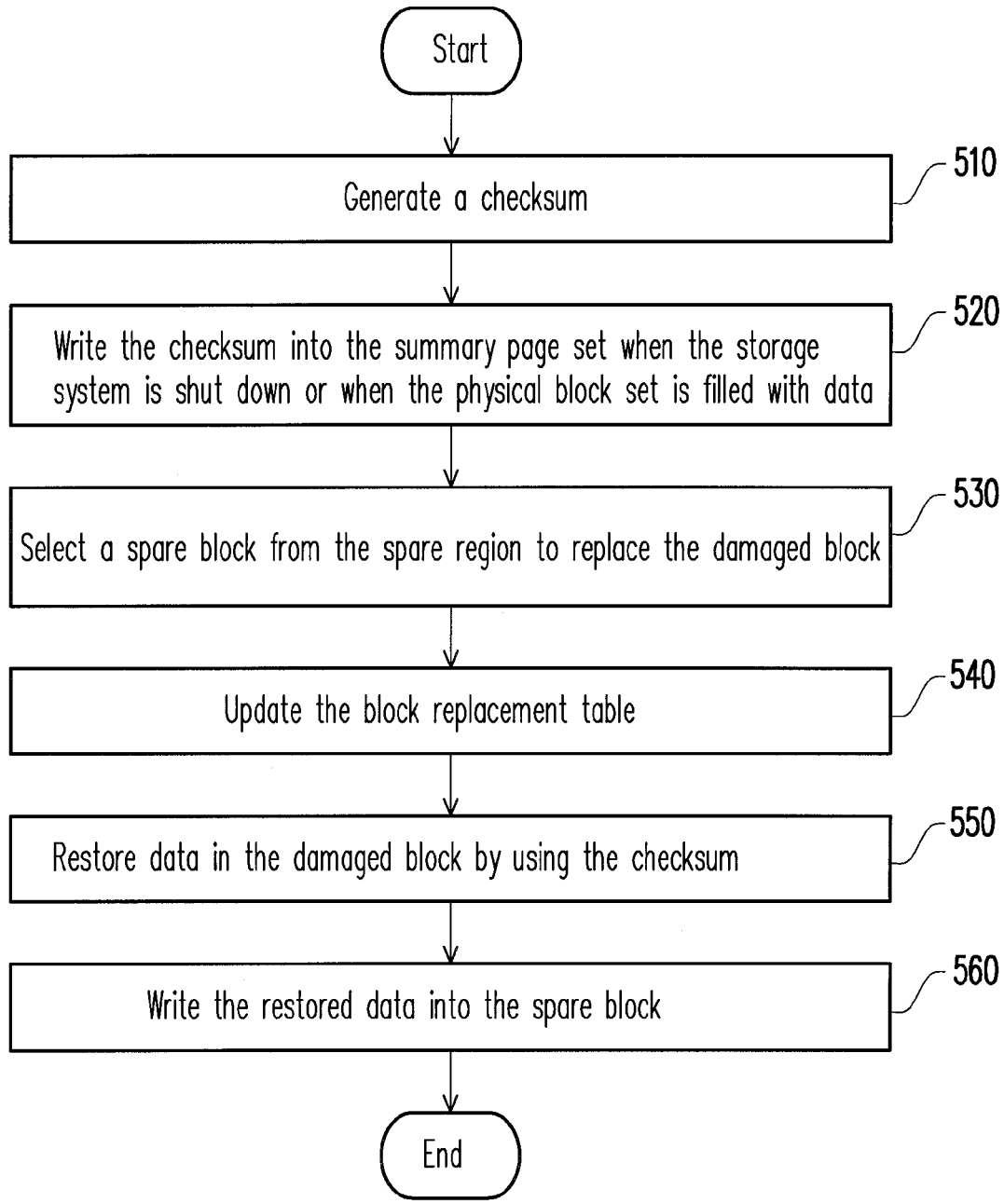

FIG. 5 is yet another flowchart of the region-based management method in the present embodiment, and this flow is suitable for managing damaged blocks in the non-volatile memory 105. Below, the flow illustrated in FIG. 5 will be described.

First, each physical block set has a corresponding checksum. The length of the checksum is equal to the data capacity of a physical page. For each data word in a physical page, there is a corresponding word in the checksum. Every time when a physical page set is filled with data, a predetermined operation is performed on the data in every physical page of the physical page set and the checksum of the physical block set containing the physical page set to generate a new checksum covering all the data in the physical block set (step 510). In the present embodiment, the predetermined operation is an exclusive-or operation, and the initial value of the checksum is all zero. When a physical page set is filled with data, the exclusive-or operation is performed on each physical page of the physical page set and the current checksum to generate the new checksum. Therefore, the aforementioned checksum is an error correction code used for restoring data in a damaged page. When the storage system containing the non-volatile memory 105 is shut down or the aforementioned physical block set excluding the summary page set is filled with data, the checksum is written into the summary page set of the physical block set (step 520).

Next, if a physical block is damaged, a spare block is selected among the physical blocks in the spare region 158 that belongs to the same chip as the damaged block, and the damaged block is replaced by the spare block (step 530). The number of the chip containing to the damaged block and the spare block, and the numbers of the damaged block and the spare block in the chip, are recorded in a block replacement table (step 540). The following table 1 is an example of the block replacement table. As shown in table 1, the physical block no. 3584 in the chip no. 1 is damaged and replaced by using the physical block no. 3995 in the same chip, the physical block no. 1 in the chip no. 2 is damaged and replaced by using the physical block no. 3994 in the same chip, and so on. Thereby, the integrities of the physical block sets and the physical page sets are maintained.

TABLE 1

Example of Block Replacement Table

| | Chip No. | | | |
|---|---|---|---|---|
| | 1 | 1 | 2 | 3 |
| Damaged Block | 3584 | 2585 | 1 | 1187 |
| Spare Block | 3995 | 3996 | 3994 | 3880 |

Thereafter, data in the damaged block is restored by using the previously generated checksum (step 550), wherein the damaged data is restored in unit of physical pages. After that, the restored data is written into the previously selected spare block (step 560). The flow ends here.

As described above, the three-level address translation architecture provided by the present invention increases the efficiency of translating LBAs to PBAs, requires less memory at address translation, and offers a high scalability. The updated virtual block tables and virtual page tables are written back into the non-volatile memory every time when the storage system is shut down. Therefore these tables can be directly accessed when the storage system is booted up as long as the storage system is shut down normally. Accordingly, the virtual block tables and virtual page tables need not to be re-established and can be accessed quickly. In addition, only the tables corresponding to the actually accessed virtual region and virtual block are read from the non-volatile memory and stored into the RAM. Thus, the use of the RAM is greatly reduced. Even if the system is damaged, only the accessed portion needs to be re-established when next time the system is booted up. Thereby, the system offers a high scalability and address translation efficiency. The three-level address translation does not slow down along with the increase of the capacity of the non-volatile memory therefore is adaptable to large-capacity storage systems.

According to the present invention, the non-volatile memory includes a plurality of chips, and these chips can be accessed in parallel through multiple hardware channels. Thus, the data access efficiency is improved. In addition, the present invention uses the spare region and the block replacement table to replace damaged physical blocks so that the parallelism of data access to damaged physical block sets and physical page sets can be retained. According to the present invention, the checksum generated according to the data in each page of a physical block is stored in the summary page set of the physical block. The checksum is used for restoring data stored in any damaged page in the physical block. Thus, data in any damaged page in a damaged block can always be restored.

In short, the access efficiency and data reliability of the non-volatile memory are improved in the present invention.

It will be apparent to those skilled in the art that various modifications and variations can be made to the structure of the present invention without departing from the scope or spirit of the invention. In view of the foregoing, it is intended that the present invention covers modifications and variations of this invention provided, they fall within the scope of the following claims and their equivalents.

What is claimed is:

1. A region-based management method, applicable to a non-volatile memory, wherein the non-volatile memory comprises one or more chips, each of the chips comprises a plurality of physical blocks, and each of the physical blocks comprises a plurality of physical pages, the region-based management method comprises:
    grouping the physical blocks of the chips into a plurality of physical regions and a spare region, wherein each of the physical regions and the spare region comprises a plurality of physical blocks;
    dividing each of the physical regions into a plurality of physical block sets, wherein each of the physical block sets is formed by the physical blocks that are in different chips and have the same number;
    dividing each of the physical block sets into a plurality of physical page sets, wherein each of the physical page sets is formed by the physical pages having the same offset in the physical blocks of the physical block set containing the particular physical page set;
    using each of the physical block sets as a smallest unit of space allocation and garbage collection;
    using each of the physical page sets as a smallest unit of data access;
    defining a logical space, wherein the logical space comprises a plurality of virtual regions, each of the virtual regions comprises a plurality of virtual blocks, and each of the virtual blocks comprises a plurality of virtual pages; and
    establishing mapping relationships between the virtual regions, the virtual blocks, and the virtual pages and the physical regions, the physical block sets, and the physical page sets;
    wherein one of the physical page sets in each of the physical block sets is a summary page set, each of the physical block sets corresponds to a checksum, and the region-based management method further comprises:
    every time when a physical page set is filled with data, performing an operation on data in the physical page set and the checksum of the physical block set containing the physical page set to generate a new checksum covering all data in the physical block set; and
    when the system comprising the non-volatile memory is shut down or the physical block set excluding the summary page set is filled with data, writing the checksum into the summary page set.

2. The region-based management method according to claim 1, wherein the non-volatile memory is a multi-level cell (MLC) flash memory.

3. The region-based management method according to claim 1, wherein the step of establishing the mapping relationships further comprises:
    sequentially mapping each of the virtual regions to one of the physical regions;
    mapping each of the virtual blocks to one of the physical block sets in the physical region mapped to the virtual region containing the particular virtual block; and mapping each of the virtual pages to one of the physical page sets in the physical block set mapped to the virtual block containing the particular virtual page.

4. The region-based management method according to claim 3, wherein each of the virtual regions corresponds to a virtual block table, each of the virtual blocks corresponds to a virtual page table, a virtual region table records addresses of the virtual block tables in a random access memory (RAM), each of the virtual block tables records address translation information of the virtual blocks in the corresponding virtual region and the corresponding physical block sets, each of the virtual block tables also records addresses of the virtual page tables corresponding to the virtual blocks of the corresponding virtual region in the RAM, and each of the virtual page tables records address translation information of the virtual pages in the corresponding virtual block and the corresponding physical page sets; the region-based management method further comprises:
   receiving a first logical block address (LBA); and
   looking up the virtual region table, one of the virtual block tables, and one of the virtual page tables by using the first LBA, so as to obtain a physical block address (PBA) of data corresponding to the first LBA in the non-volatile memory.

5. The region-based management method according to claim 4, further comprising:
   dividing the first LBA into a virtual region address, a virtual block address, and a virtual page address;
   looking up the virtual region table by using the virtual region address as an index, so as to obtain the address of the virtual block table corresponding to the virtual region corresponding to the virtual region address in the RAM;
   looking up the virtual block table by using the virtual block address as an index, so as to obtain the address translation information of the virtual block corresponding to the virtual block address and the address of the virtual page table corresponding to the virtual block in the RAM;
   looking up the virtual page table by using the virtual page address as an index, so as to obtain the address translation information of the virtual page corresponding to the virtual page address; and
   generating the PBA of the data corresponding to the first LBA in the non-volatile memory according to the virtual region address and the address translation information provided by the virtual block table and the virtual page table.

6. The region-based management method according to claim 4, further comprising:
   when one of the virtual regions is accessed, reading the virtual block table corresponding to the virtual region from the spare region;
   storing the virtual block table into the RAM; and
   when a system comprising the non-volatile memory is shut down and the virtual block table is updated since the last reading from the spare region, writing the virtual block table back into the spare region.

7. The region-based management method according to claim 4, further comprising:
   when one of the virtual regions is accessed, reading a second LBA from a spare area of one of the physical pages in each of the physical block sets of the physical region mapped to the virtual region, so as to establish the virtual block table corresponding to the virtual region.

8. The region-based management method according to claim 4, wherein one of the physical page sets in each of the physical block sets is a summary page set, and the region-based management method further comprises:
   when one of the virtual blocks is accessed, reading the virtual page table corresponding to the virtual block from the summary page set of the physical block set mapped to the virtual block;
   storing the virtual page table into the RAM; and
   when the system comprising the non-volatile memory is shut down and the virtual page table is updated since the last reading from the summary page set, writing the virtual page table back into the summary page set.

9. The region-based management method according to claim 4, further comprising:
   when one of the virtual blocks is accessed, reading a second LBA from a spare area of one of the physical pages in each of the physical page sets of the physical block set mapped to the virtual block, so as to establish the virtual page table corresponding to the virtual block.

10. The region-based management method according to claim 1, further comprising:
    when one of the physical blocks is damaged, selecting a spare block among the physical blocks in the spare region that belongs to the same chip as the physical block does and using the spare block to replace the damaged block.

11. The region-based management method according to claim 10, further comprising:
    using a block replacement table to record a number of the chip comprising the damaged block and the spare block and numbers of the damaged block and the spare block in the chip.

12. The region-based management method according to claim 10, further comprising:
    using the checksum to restore data in the damaged block; and
    writing the restored data into the spare block.

13. The region-based management method according to claim 1, wherein the summary page set is formed by the last physical page in each of the physical blocks of the physical block set.

14. The region-based management method according to claim 1, wherein the operation is an exclusive-or operation.

* * * * *